United States Patent [19]
Pernet

[11] Patent Number: 5,546,975
[45] Date of Patent: Aug. 20, 1996

[54] CONTROL DEVICE FOR A FLUID PASSING THROUGH A BYPASS AND SYSTEM EQUIPPED WITH SUCH A DEVICE TO REGULATE THE SUPERCHARGING AIR OF AN INTERNAL COMBUSTION ENGINE

[75] Inventor: Jean-Paul Pernet, Chassieu, France

[73] Assignee: Renault Vehicules Industriels, Lyons, France

[21] Appl. No.: 318,093

[22] Filed: Oct. 5, 1994

[30] Foreign Application Priority Data

Oct. 5, 1993 [FR] France ..................... 93 11856

[51] Int. Cl.$^6$ .............. F16K 1/16; F02B 29/04
[52] U.S. Cl. .............. 137/115.16; 137/875; 137/118.06; 123/563
[58] Field of Search .............. 60/599; 123/563; 137/118, 115, 119, 875, 878; 251/58

[56] References Cited

U.S. PATENT DOCUMENTS 1,371,444  3/1921  Sherbondy ............... 123/563
3,712,282  1/1973  Isley ........................ 123/563
4,483,150  11/1984  Melchior et al. ......... 60/599
4,513,729  4/1985  Udd ......................... 123/563

FOREIGN PATENT DOCUMENTS 0080983  6/1983  European Pat. Off. .
602348  6/1994  European Pat. Off. ........ 60/599
2055963  3/1981  United Kingdom .
2223272  4/1990  United Kingdom ........ 123/563
WO92/01145  1/1992  WIPO .

Primary Examiner—Michael Koczo
Attorney, Agent, or Firm—Oblon, Spivak, McClelland, Maier, & Neustadt, P.C.

[57] ABSTRACT

A device for controlling the circulation of a fluid through a fluid bypass (3) consists of an actuator (14) which is actuated pneumatically and directly by the fluid located in the bypass so as to close, at least partially, bypass outlet (3c) when the pressure of the fluid in the bypass is higher than a predetermined pressure threshold (PO).

6 Claims, 4 Drawing Sheets

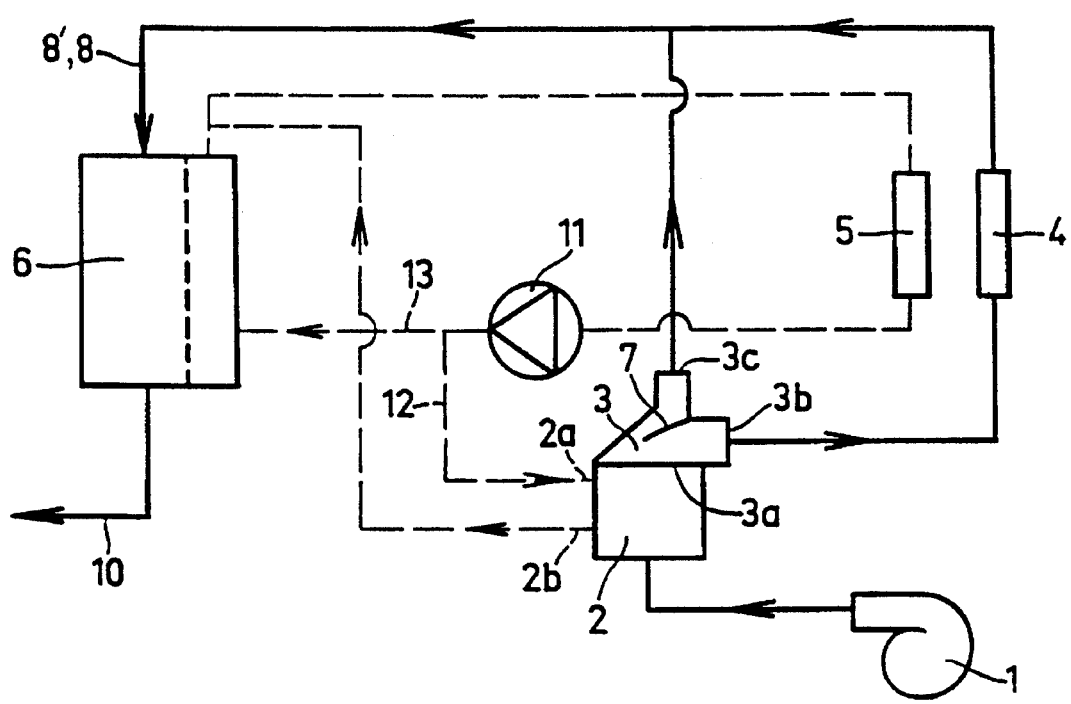
FIG_1

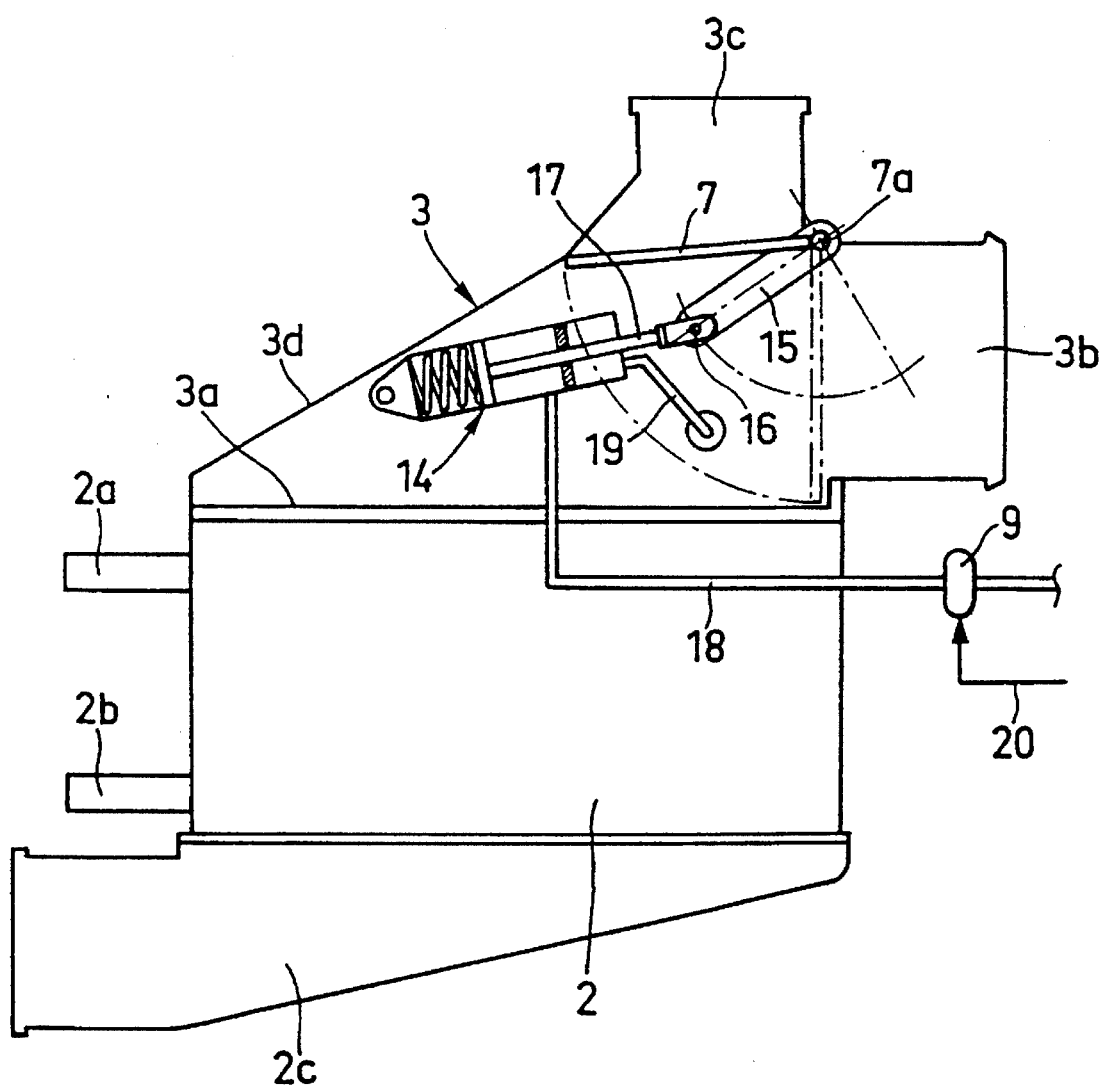
FIG_2

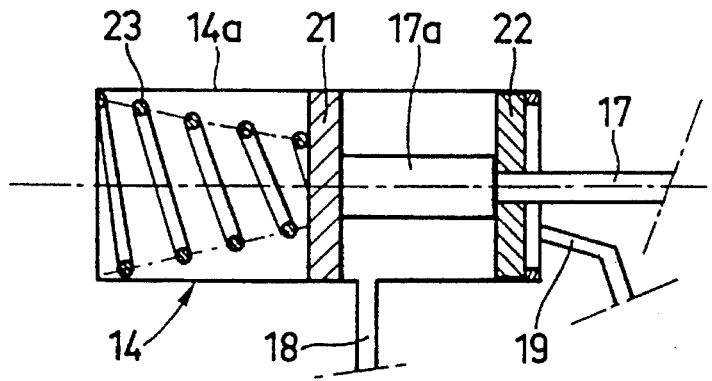
FIG_3a
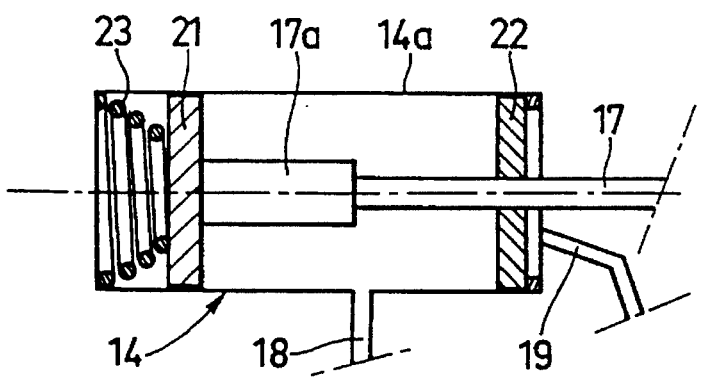
FIG_3b
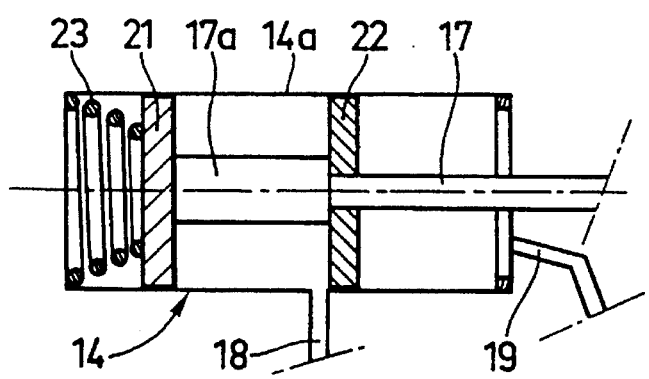
FIG_3c

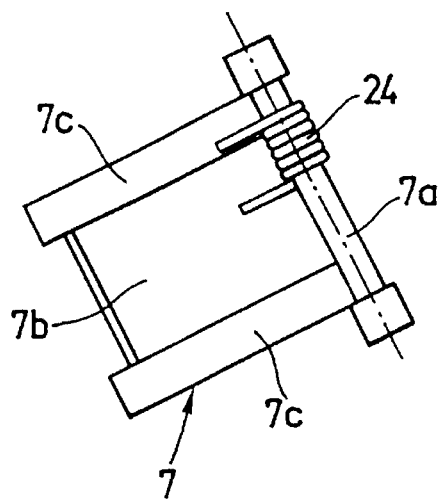
FIG_4b
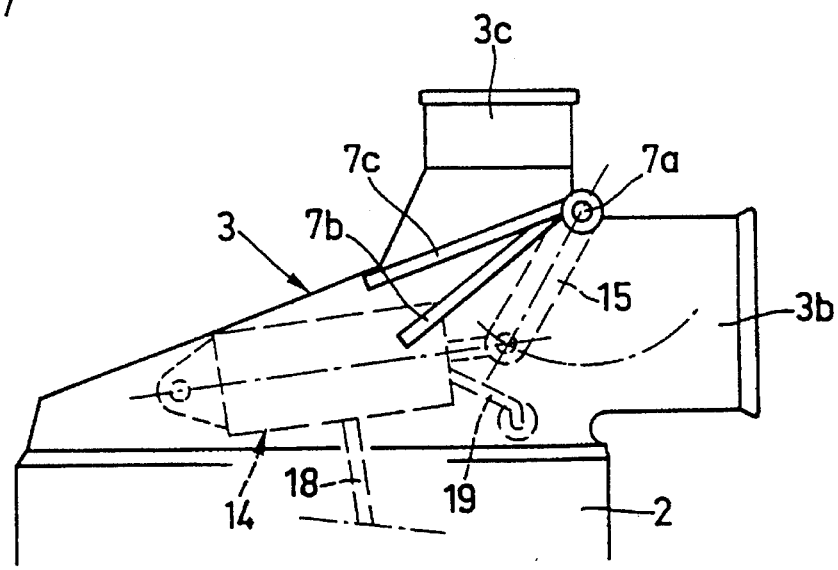
FIG_4a
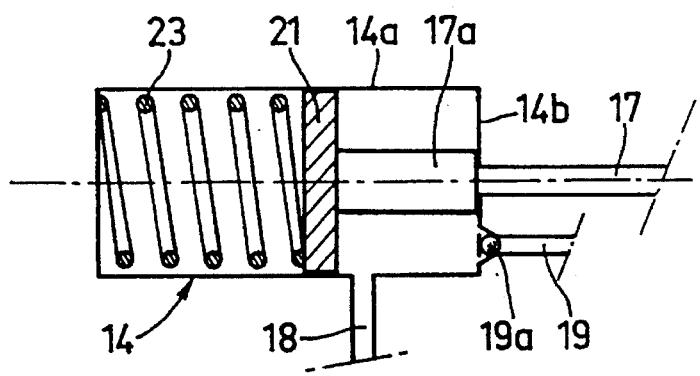
FIG_5

CONTROL DEVICE FOR A FLUID PASSING THROUGH A BYPASS AND SYSTEM EQUIPPED WITH SUCH A DEVICE TO REGULATE THE SUPERCHARGING AIR OF AN INTERNAL COMBUSTION ENGINE

BACKGROUND OF THE INVENTION

1. Field of the Invention

This invention relates to a process and a control device for the circulation of a fluid through a fluid bypass. The invention more particularly relates to a regulation system for the supercharging air of an internal combustion engine.

2. Description of the Related Art

Bypass boxes or bypasses have been used selectively to distribute a fluid into one of two separate ducts. Generally, a bypass comprises an exterior casing or wall that delimits a fluid inlet, a main fluid outlet, a secondary fluid bypass outlet and an interior chamber for fluid in which there is placed a blocking flap pivoting between a position that closes the main outlet and a position that closes the bypass outlet. When the main outlet is blocked by the flap, the bypass is opened. When the secondary bypass outlet is blocked by the flap, the bypass is closed.

Generally, the blocking flap of the bypass is actuated by a hydraulic actuator or an electromagnetic actuator. Control of the actuator is provided by an electronically controlled system requiring numerous data sensors to respond to the operating requirements of the system.

International patent application WO 92/01145 provides for such a regulation system for supercharging air. In this document, the supercharging air exiting a turbocharger is first cooled with the help of an engine cooling liquid/supercharging air heat exchanger. The supercharging air exiting this heat exchanger goes into a bypass whose main outlet is connected to a second supercharging air/ambient air heat exchanger and whose secondary bypass outlet is connected directly to the intake manifold of the engine.

A central electronic control unit manages the data supplied by the temperature sensors: the temperature of the supercharging air entering the engine, the temperature of the combustion gases exiting the engine and the temperature of the exhaust gases, and by other sensors supplying notably the engine speed. The central control unit then electrically controls an electromechanical actuator that controls the pivoting of the blocking flap of the bypass. Such a regulation system is particularly complex and requires a large number of data sensors with a central unit managed electronically.

SUMMARY OF THE INVENTION

It is an object of the invention to provide a simple process for controlling the circulation of a fluid through a bypass, using a pneumatic control achieved directly by the pressure of the fluid in the bypass to control the blocking flap of the bypass.

It is another object of the invention to provide a device for putting the process into practice with a simple and economical structure.

The process of the invention is intended to control the circulation of a fluid through a fluid bypass that includes an inlet, a main outlet, a secondary bypass outlet and an element for selectively blocking said outlets, the blocking element being controlled by an actuator. According to the invention, the actuator is actuated pneumatically and directly by the fluid in the bypass so as to close the bypass outlet when the pressure of the fluid in the bypass is higher than a predetermined pressure threshold.

According to a variant of the invention, the bypass outlet that is in the closed state is opened partially when the temperature of the fluid in the bypass is lower than a first predetermined temperature threshold. This partial opening can be achieved by thermally sensitive mechanical element acting directly on the blocking flap.

Advantageously, the actuator can also be actuated pneumatically by a control fluid separate from the fluid passing through the bypass, so as to be able to close the bypass outlet when the temperature of the fluid at the bypass outlet is higher than a second predetermined temperature threshold. In this case, the pneumatic control means of the actuator requires a source of fluid under pressure separate from the fluid in the bypass, for example compressed air. Pneumatic actuators are also provided.

Among the numerous possible applications of this invention, there can be cited the particular case of a regulation system for supercharging air for an internal combustion engine. Such an application is particularly significant for road vehicles to improve their performance and the reliability of the engines, and to comply with antipollution standards for exhaust gases from the engine.

This invention makes it possible to simplify the regulation system of the supercharging air while eliminating the need for a central electronic unit by replacing it with a pneumatically driven control.

BRIEF DESCRIPTION OF THE FIGURES

The invention will be better understood with reference to the detailed embodiments taken as nonlimiting examples and illustrated by the accompanying drawings, in which:

FIG. 1 is a schematic diagram of a supercharging air bypass for an internal combustion engine;

FIG. 2 is a schematic view of part of FIG. 1 made according to the present invention;

FIGS. 3a to 3c schematically show three operational states of a pneumatic actuator according to the invention;

FIGS. 4a and 4b schematically illustrate the partial opening of the blocking flap according to the invention; and FIG. 5 is a schematic view of another pneumatic actuator according to the invention.

DETAILED DESCRIPTION OF THE PREFERRED EMBODIMENTS

The regulation system for the supercharging air as illustrated in FIG. 1 comprises a turbocharger 1, a first air/liquid heat exchanger 2, a bypass 3, a first radiator 4 for cooling the supercharging air and a second radiator 5 for the coolant for engine 6.

As shown in FIG. 1, the turbocharger supplies supercharging air that first passes into air/liquid heat exchanger 2 before going through bypass 3. The air/liquid heat exchanger is fed via an inlet 2a with liquid coolant from the engine. An outlet 2b drains the liquid coolant that has passed through heat exchanger 2. Depending on the temperature of the supercharging air and that of the coolant liquid, the cooling liquid either cools or reheats the supercharging air passing through heat exchanger 2.

In exiting heat exchanger 2, the supercharging air passes through bypass 3 via its inlet 3a and exits either via main outlet 3b or by secondary bypass outlet 3c. The selective blocking of outlets 3b and 3c is performed by a pivoting flap 7 in bypass 3.

A temperature sensor is located in the intake manifold 8 for the supercharging air, immediately upstream from engine 6, and supplies a control signal to a solenoid valve 9 (FIG. 2) when the measured temperature of the supercharging air exceeds a predetermined temperature threshold T2, to actuate a controller of pivoting flap 7 so as to open main outlet 3b and close bypass outlet 3c. Therefore, by operation of the flap 7, hot supercharging air is discharged through main outlet 3b to be cooled a second time by radiator 4 before being sent into the air intake manifold of engine 6. When the temperature measured by sensor 8 is less than predetermined threshold T2, blocking flap 7 closes main outlet 3b and opens bypass outlet 3c, so that the relatively cool supercharging air exits via the bypass outlet 3c to be sent directly into the supercharging air intake manifold of engine 6. The exiting combustion gases of engine 6 are removed by a duct 10 to the exhaust system, not shown.

The engine coolant pump 11 pumps engine coolant in a closed system. The engine coolant is cooled by a radiator 5 and optionally by heat exchanger 2 when the supercharging air has a temperature lower than that of the coolant. Inlet 2a of the heat exchanger is connected to the downstream side of hydraulic pump 11 by a bypass duct 12, main duct 13 connecting hydraulic pump 11 to engine 6. Outlet 2b of heat exchanger 2 is connected to the coolant outlet of engine 6 so that the liquid coolant exiting heat exchanger 2 is not directly recycled to the engine, and so the cooling of the engine is not hindered. Thus, hydraulic optimization and a better energy balance are achieved for the cooling system of the engine.

FIG. 2 schematically shows the assembly formed by air/liquid heat exchanger 2, bypass 3 and control means 14 for the blocking flap 7 of bypass 3. Heat exchanger 2 has an inlet 2c for the supercharging air.

Bypass 3 has an exterior casing or wall 3d that delimits bypass inlet 3a, main outlet 3b and secondary bypass outlet 3c, and an interior chamber for the supercharging air. Blocking flap 7 pivots in the interior chamber of the bypass around an axis 7a located at one of its edges, the axis being horizontal in the figure. Pivoting axis 7a extends through the bypass and crosses exterior wall 3d of the bypass, and connects to an end of a lever arm 15 such that the two pivot together. The other end of lever arm 15 has a pivot axis 16, to which is pivotally connected the free end of a rod 17 of a piston of a control actuator 14. The movement of rod 17 of the piston of the actuator drives the pivoting of arm 15 around axis 7a, which in turn pivots the blocking flap 7.

Control actuator 14 is pneumatically controlled by two separate pneumatic sources, one consisting of compressed air of a constant pressure from the operating system of the vehicle, via duct 18, and the other consisting of the supercharging air from the interior chamber of bypass 3, via duct 19.

As mentioned above, solenoid valve 9 installed on connection duct 18 is controlled by an electric signal 20 from a temperature sensor 8' in manifold 8 (FIG. 1). When the temperature measured by sensor in manifold 8 exceeds a predetermined temperature threshold T2, for example on the order of 50° C., solenoid valve 9 is opened so the compressed air actuates pneumatic actuator 14 to close secondary bypass outlet 3c via the blocking flap 7. But when the temperature measured by sensor 8 is less than predetermined threshold T2, solenoid valve 9 stays in the closed state, which eliminates the pneumatic actuation by the operating system via connection duct 18. The spring of pneumatic actuator 14 then returns it to its standby state while returning blocking flap 7 to its open position, i.e., blocking main outlet 3b of bypass 3.

Pneumatic actuator 14 is also automatically controlled pneumatically and directly by the supercharging air located in bypass 3 via duct 19 which passes through exterior wall 3d of the bypass. The pressure prevailing in bypass 3 constitutes a means of automatic pneumatic actuation of actuator 14, independent of the temperature regulation. When the internal pressure in bypass 3 exceeds a predetermined pressure threshold PO, which is a pressure predetermined by the inherent characteristics of pneumatic actuator 14, the supercharging air actuates the pneumatic actuator to return bypass 3 to the closed state, i.e., it closes bypass outlet 3c via blocking flap 7. When the pressure of the supercharging air in the bypass has again become less than predetermined threshold PO, pneumatic actuator 14 returns, under the effect of its spring, to its standby state, thereby reopening bypass 3c.

FIGS. 3a, 3b and 3c illustrate an embodiment of the pneumatic actuator 14. The pneumatic actuator 14 there comprises a housing 14a in which two pistons 21 and 22 slide. First piston 21 is integral with the end of rod 17, and second piston 22 slides with respect to rod 17. Cylindrical part 17a of rod 17 has a section that is larger than that of the rest of rod 17, to form an axial stop for second piston 22. A compression spring 23 held within the cylindrical housing of the actuator 14, on a side of the piston 21 opposite the rod 17, presses axially against first piston 21 to push the rod 17 out of housing 14a, which translates into a return force exerted on blocking flap 7 to open the bypass.

FIG. 3a shows the pneumatic actuator 14 in the standby state in which the return force of axial compression spring 23 has moved the flap 7. This corresponds to the state where the temperature of the supercharging air at the inlet to engine 6, measured by the sensor in the manifold 8, is less than predetermined threshold T2 and the pressure of the supercharging air in bypass system 3 is less than predetermined threshold PO. This is the case, for example, on starting of engine 6.

FIG. 3b illustrates a state of pneumatic actuation of the actuator 14 shown in FIG. 3a, by the operating system of the vehicle via connection duct 18. The pressure of the compressed air introduced into the housing 14a acts in an opposite direction to compression spring 23 and compresses it, and simultaneously drives rod 17 into the housing 14a. This translates into a closing of bypass 3 by pivoting blocking flap 7. Second piston 22 is pressed by the pneumatic pressure in the housing toward the other end of the housing. This state of operation of pneumatic actuator 14 corresponds to a state where the temperature of the supercharging air entering engine 6, measured by the sensor, has become higher than predetermined threshold T2 and the pressure of the supercharging air in bypass 3 is less than predetermined threshold PO.

FIG. 3c illustrates a state of actuation of pneumatic actuator 14 by second piston 22, which is pushed pneumatically by the pressure of the supercharging air located in the bypass and applied via duct 19. Second piston 22 there rests axially on enlarged cylindrical part 17a of rod 17, thereby moving first piston 21 against compression spring 23. Bypass 3 is then in the closed state due to the pivoting of the blocking flap 7, driven by the movement of rod 17.

The pneumatic actuation of second piston 22 is thus achieved directly by the supercharging air located in the bypass and is done automatically and independently of other conditions since it is only necessary that the pressure of the supercharging air in the bypass be higher than predetermined pressure threshold PO. The value of predetermined pressure threshold PO is determined mainly by the return force of compression spring 23. This value can be set, for example, at 1.4 bars.

FIG. 5 illustrates another embodiment of pneumatic actuator 14, whose operation is equivalent to that which was just described. In this embodiment, second sliding piston 22 is eliminated and a nonreturn valve 19a is added to connection duct 19 linking housing 14a and bypass 3. The pneumatic actuation of actuator 14 triggered by the temperature sensor remains identical. The function of nonreturn valve 19a is to prevent communication between housing 14a, under pneumatic pressure fed by duct 18, and bypass 3, while making communication possible when housing 14a is not fed pneumatically via connection duct 18. Enlarged cylindrical part 17a constitutes a stop with respect to radial wall 14b at the end of housing 14a. Compression spring 23 can be a cylindrical (FIG. 5) or tapered (FIG. 3) helical spring.

FIGS. 4a and 4b show another significant characteristic of the invention. Beyond the operation described above, it is possible to achieve thermal regulation by partial opening of the blocking flap. In this operating case, there is a variable portion of the supercharging air that is directed directly toward the engine via the bypass outlet 3c.

Blocking flap 7 consists of two parts: a central part 7b and a part forming framework 7c that is lateral to central part 7b. Air can pass through the flap 7 between the central part and the framework when the central part and the framework are angularly separated as shown in FIG. 4a, but not when they are angularly aligned.

A bimetallic spring 24 is wound around pivoting axis 7a of flap 7 and has its two ends supported respectively on central part 7b and the part forming framework 7c of the flap. The twisting force of bimetallic spring 24 tends to angularly separate parts 7b and 7c of flap 7, as shown in FIG. 4a.

Bimetallic spring 24 is preferably made from a material whose thermal expansion coefficient is high. The twisting force of bimetallic spring 24 decreases when the temperature to which the spring is subjected increases. The characteristics of bimetallic spring 24 can be selected as a function of a predetermined temperature threshold T1, below which bimetallic spring 24 partially opens central part 7b of the flap with respect to framework 7c of the flap, which translates into a partial opening of blocking flap 7.

In use (FIG. 4), when bypass 3 is in the closed state, i.e., when flap 7 blocks bypass outlet 3c, and if the temperature of the supercharging air in the interior of bypass 3 becomes less than predetermined temperature threshold T1, the thermal deformation of bimetallic spring 24 partially opens flap 7, letting a fraction of the supercharging air pass directly toward the intake manifold of engine 6, to achieve thermal regulation of the supercharging air at the engine intake. Predetermined temperature threshold T1 can be identical or different from predetermined temperature threshold T2 for the supercharging air arriving in the intake manifold of engine 6. The force of bimetallic spring 24 is overcome when flap 7 closes main outlet 3b.

It is possible to replace bimetallic spring 24 with a stop for flap 7 in the closed state. The stop can have a part made of a memory alloy able to be deformed thermally and acting on central part 7b of flap 7 to open the same when the temperature of the supercharging air in the interior of bypass 3 becomes less than predetermined temperature threshold T1. The partial opening of flap 7 is thus provided for.

Obviously, numerous modifications and variations of the present invention are possible in light of the above teachings. It is therefore to be understood that the invention may be practiced otherwise than as specifically described herein.

What is claimed is:

1. Device for control of the circulation of a fluid through a fluid bypass having an exterior casing delimiting an interior chamber for fluid flow, a fluid inlet, a main fluid outlet and a secondary fluid bypass outlet, said device comprising:

a blocking flap pivotally mounted in the interior chamber of the bypass for movement between a position that closes the main outlet and a position that closes the bypass outlet;

a pneumatic actuator having a housing, and having a piston rod connected to the blocking flap for moving the blocking flap;

a connection duct fluidically connected between the interior chamber of the bypass and the housing of the actuator such that a pressure of a fluid in said interior chamber is applied to said actuator;

an elastic return element in said actuator, said elastic return element having a return force selected as a function of a predetermined bypass fluid pressure threshold at which said bypass outlet is to be closed; and a further actuator for moving the blocking flap, said further actuator comprising a thermally responsive element which is responsive to a temperature of the pneumatic fluid in said bypass.

2. Device according to claim 1 wherein said pneumatic actuator further comprises a first piston integral with one end of the piston rod and a second piston axially slidable with respect to the piston rod, the first piston being in contact with said return element, the piston rod having a widened cylindrical part in said housing and constituting an axial stop for the second piston.

3. Device according to claim 1, wherein said connection duct includes a nonreturn valve.

4. Device according to claim 1 wherein said blocking element comprises a central part and a part forming a lateral framework, and said further actuator comprises a thermally deformable bimetallic spring acting on the two parts of the flap respectively, whereby the flap is partially opened when a temperature of the fluid in the bypass is less than a predetermined temperature threshold.

5. Device according to claim 1, wherein said blocking element comprises a central part, a part forming a lateral framework and a stop element, the stop element being made of a thermally deformable memory alloy and engaging the central part of the blocking flap so as to close the bypass outlet when the temperature of the fluid in said bypass is less than a predetermined temperature threshold.

6. Device for control of the circulation of a fluid through a fluid bypass having an exterior casing delimiting an interior chamber for fluid flow, a fluid inlet, a main fluid outlet and a secondary fluid bypass outlet, said device comprising:

a blocking flap pivotally mounted in the interior chamber of the bypass for movement between a position that closes the main outlet and a position that closes the bypass outlet;

a pneumatic actuator having a housing, and having a piston rod connected to the blocking flap for moving the blocking flap;

a connection duct fluidically connected between the interior chamber of the bypass and the housing of the actuator;

an elastic return element in said actuator, said elastic return element having a return force selected as a function of a predetermined bypass fluid pressure threshold at which said bypass outlet is to be closed;

another connection duct fluidically connected between said pneumatic actuator and a source of pressurized fluid;

a temperature sensor positioned for detecting a temperature of a fluid downstream from said bypass outlet; and a solenoid valve positioned to open the another connection duct when a temperature measured by the sensor exceeds a predetermined temperature threshold.

* * * * *